United States Patent

Aimura et al.

[11] Patent Number: 5,998,531
[45] Date of Patent: Dec. 7, 1999

[54] VULCANIZABLE RUBBER COMPOSITION FOR USE AS HOT-WATER SEALS

[75] Inventors: Yoshiaki Aimura, Kawasaki; Hiroko Ohnishi, Yokohama, both of Japan

[73] Assignee: Nippon Zeon Co Ltd, Tokyo, Japan

[21] Appl. No.: 09/091,498

[22] PCT Filed: Dec. 19, 1996

[86] PCT No.: PCT/JP96/03707

§ 371 Date: Jun. 19, 1998

§ 102(e) Date: Jun. 19, 1998

[87] PCT Pub. No.: WO97/23560

PCT Pub. Date: Jul. 3, 1997

[30] Foreign Application Priority Data

Dec. 21, 1995 [JP] Japan .................................. 7-349782

[51] Int. Cl.$^6$ ........................................................ C08K 3/00
[52] U.S. Cl. ........................................... 524/495; 524/496
[58] Field of Search ...................................... 524/495, 496

[56] References Cited

U.S. PATENT DOCUMENTS 5,807,948  9/1998  Sagane et al. ........................ 526/336

*Primary Examiner*—Edward J. Cain

[57] ABSTRACT

This invention provides a vulcanizable rubber composition for use as hot-water seals comprising 100 parts by weight of a rubber mixture composed of 90 to 50% by weight of a nitrile-containing highly saturated copolymer rubber obtained by hydrogenating the conjugated diene portions of an unsaturated nitrile-conjugated diene copolymer rubber or unsaturated nitrile-conjugated diene-ethylenically unsaturated monomer terpolymer rubber, and 10 to 50% by weight of an ethylene-α-olefin copolymer rubber; 0.1 to 30 parts by weight of an organic peroxide vulcanizing agent; and optionally 10 to 100 parts by weight of carbon black. Seals formed by vulcanizing this composition show a very low percent change in volume and elongation, and are not liable to the release of carbon black or the production of surface cracks, upon exposure to hot water containing bleaching powder.

18 Claims, No Drawings

VULCANIZABLE RUBBER COMPOSITION FOR USE AS HOT-WATER SEALS

TECHNICAL FIELD

This invention relates to vulcanizable rubber compositions for use as hot-water seals.

BACKGROUND ART

It is known that compositions comprising a mixture of a nitrile-containing highly saturated copolymer rubber obtained by hydrogenating the unsaturated bonds of the butadiene portions of an acrylonitrile-butadiene copolymer rubber, and an ethylene-propylene copolymer rubber can yield vulcanized products having excellent weather resistance and processability, having good heat resistance and oil resistance, and hence suitable for use as seals (for example, Japanese Patent Laid-Open Nos. 283639/'86 and 124951/'90).

Although the vulcanized products of these rubber compositions are rubber materials suitable for applications requiring excellent weather resistance and processability in combination with high strength and oil resistance, especially for automobile parts and the like, much has been unknown as to whether they can be used for applications other than automobile parts and the like. For example, it has been believed that they do not have satisfactory performance when used for applications in which they come into long-term contact with hot water containing bleaching powder capable of generating hypochlorous acid, such as hot-water seals used in hot-water generators for home or business use.

In such hot-water generators, ethylene-propylene copolymer rubber and acrylonitrile-butadiene copolymer rubber (NBR) have conventionally been used as rubber materials for hot-water seals. However, in the case of ethylene-propylene copolymer rubber, its long-term use tends to cause the release of carbon black used as the reinforcing agent. Moreover, NBR has the disadvantage that the rubber progressively hardens to produce a large number of cracks in the rubber surface. Consequently, it has been desired to develop an improved technique.

The present inventors have now discovered that, when a mixture of a nitrile-containing highly saturated copolymer rubber and ethylene-propylene copolymer rubber is vulcanized and then immersed in hot water containing bleaching powder for a long period of time, its change in volume is unexpectedly slight. The present invention has been completed on the basis of this discovery.

DISCLOSURE OF THE INVENTION

According to the present invention, there is provided a vulcanizable rubber composition for use as hot-water seals comprising 100 parts by weight of a rubber mixture composed of 90 to 50% by weight of a nitrile-containing highly saturated copolymer rubber obtained by hydrogenating the conjugated diene portions of an unsaturated nitrile-conjugated diene copolymer rubber or unsaturated nitrile-conjugated diene-ethylenically unsaturated monomer terpolymer rubber, and 10 to 50% by weight of an ethylene-α-olefin copolymer rubber (in which the sum of these components is 100% by weight); and 0.1 to 30 parts by weight of an organic peroxide vulcanizing agent.

Nitrile-containing highly saturated copolymer rubber

The nitrile-containing highly saturated copolymer rubber used in the present invention is obtained by hydrogenating the conjugated diene portions of an unsaturated nitrile-conjugated diene copolymer rubber or unsaturated nitrile-conjugated diene-ethylenically unsaturated monomer terpolymer rubber. This nitrile-containing highly saturated copolymer rubber has a bound acrylonitrile content of 10 to 50% by weight and preferably 15 to 40% by weight, an iodine value of not greater than 80, preferably not greater than 60, and more preferably not greater than 30, and a Mooney viscosity ($ML_{1+4}$, 100° C.) of 30 to 300, preferably 50 to 200, and more preferably 60 to 150. The bound acrylonitrile content is chosen so as to be most suitable for performance requirements. If the iodine value is greater than 80, the thermal resistance and strength of the resulting seals will be reduced. No particular limitation is placed on the lower limit of the iodine value. However, the iodine value should generally be at least 1 because unduly low iodine values may make it difficult to vulcanize the rubber. If the Mooney viscosity is less than 30, the resulting seals will have insufficient durability upon long-term exposure to high pressure and will show no improvement in compression set and collapse (compressive relaxation). On the other hand, if the Mooney viscosity is greater than 300, the unvulcanized rubber will have poor processability during kneading.

Unsaturated nitrile-conjugated diene copolymer rubber

The monomers used to prepare the aforesaid unsaturated nitrile-conjugated diene copolymer rubber are illustrated by giving several examples. Specific examples of the unsaturated nitrile include acrylonitrile, methacrylonitrile and α-chloroacrylonitrile; and specific examples of the conjugated diene include 1,3-butadiene, 2,3-dimethylbutadiene, isoprene and 1,3-pentadiene.

Unsaturated nitrile-conjugated diene-ethylenically unsaturated monomer terpolymer rubber In order to prepared the unsaturated nitrile-conjugated diene-ethylenically unsaturated monomer terpolymer rubber, an ethylenically unsaturated monomer or other monomer copolymerizable with unsaturated nitriles and conjugated dienes is used.

Examples of such a monomer include aromatic vinyl monomer such as styrene, α-methylstyrene and vinylpyridine; unconjugated diene monomers such as vinylnorbornene, dicyclopentadiene and 1,4-hexadiene; acrylates and methacrylates having an alkyl group of about 1 to 18 carbon atoms, such as methyl acrylate, ethyl acrylate, propyl acrylate, n-butyl acrylate, t-butyl acrylate, isobutyl acrylate, n-pentyl acrylate, isononyl acrylate, n-hexyl acrylate, 2-methylpentyl acrylate, n-octyl acrylate, 2-ethylhexyl acrylate, n-dodecyl acrylate, methyl methacrylate and ethyl methacrylate; acrylates having an alkoxyalkyl group of about 2 to 12 carbon atoms in total, such as methoxymethyl acrylate, methoxyethyl acrylate, ethoxyethyl acrylate, butoxyethyl acrylate and ethoxypropyl acrylate; acrylates having a cyanoalkyl group of about 2 to 12 carbon atoms, such as α- or β-cyanoethyl acrylate, α-, β- or γ-cyanopropyl acrylate, cyanobutyl acrylate, cyanohexyl acrylate and cyanooctyl acrylate; hydroxyalkyl-containing acrylates such as 2-hydroxyethyl acrylate and hydroxypropyl acrylate; and unsaturated dicarboxylic acid mono- and dialkyl esters such as monoethyl maleate, dimethyl maleate, dimethyl fumarate, diethyl fumarate, di-n-butyl fumarate, di-2-ethylhexyl fumarate, dimethyl itaconate, di-n-butyl itaconate and di-2-ethylhexyl itaconate.

Other unsaturated carboxylic acid ester monomers include, for example, dimethylaminomethyl acrylate, diethylaminoethyl acrylate, 3-(diethylamino)-2-hydroxypropyl acrylate and 2,3-bis(difluoroamino)propyl acrylate. Further examples include fluoroalkyl-containing acrylates and methacrylates such as trifluoroethyl acrylate, tetrafluoropropyl acrylate, pentafluoropropyl acrylate, heptafluorobutyl acrylate, octafluoropentyl acrylate, nonafluoropentyl acrylate, undecafluorohexyl acrylate, pentadecafluorooctyl acrylate, heptadecafluorononyl acrylate, heptadecafluorodecyl acrylate, nonadecafluorodecyl methacrylate, trifluoroethyl methacrylate, tetrafluoropropyl methacrylate, octafluoropentyl methacrylate, dodecafluoroheptyl methacrylate, pentadecafluorooctyl methacrylate and hexadecafluorononyl methacrylate; fluorinated benzyl acrylates and methacrylates such as fluorobenzyl acrylate, fluorobenzyl methacrylate and difluorobenzyl methacrylate; fluoroalkyl vinyl ethers such as fluoroethyl vinyl ether, fluoropropyl vinyl ether, trifluoromethyl vinyl ether, trifluoroethyl vinyl ether, perfluoropropyl vinyl ether and perfluorohexyl vinyl ether; and fluorine-containing vinyl monomers o- or p-trifluoromethylstyrene, vinyl pentafluorobenzoate, difluoroethylene and tetrafluoroethylene, as well as polyethylene glycol acrylate, polypropylene glycol acrylate, epoxy acrylate, urethane acrylate, polyethylene glycol methacrylate, polypropylene glycol methacrylate, epoxy methacrylate and urethane methacrylate.

No particular limitation is placed on the amount in which the ethylenically unsaturated monomer or other monomer copolymerizable with unsaturated nitriles and conjugated dienes is used. However, it is usually used in an amount of not greater than 80% by weight, preferably 15 to 60% by weight, and more preferably 20 to 40% by weight, based on the total amount of monomers.

Specific examples of the nitrile-containing highly saturated copolymer rubber include hydrogenated products of butadiene-acrylonitrile copolymer rubber, isoprene-butadiene-acrylonitrile copolymer rubber and isoprene-acrylonitrile copolymer rubber; and hydrogenated products of butadiene-methyl acrylate-acrylonitrile copolymer rubber, butadiene-acrylic acid-acrylonitrile copolymer rubber and butadiene-unsaturated dicarboxylic acid ester-acrylonitrile copolymer rubbers. A further example is butadiene-ethylene-acrylonitrile copolymer rubber.

No particular limitation is placed on the method for preparing the nitrile-containing highly saturated copolymer rubber used in the present invention, i.e., the method for hydrogenating the conjugated diene unit portions of an unsaturated nitrile-conjugated diene copolymer rubber or unsaturated nitrile-conjugated diene-ethylenically unsaturated monomer terpolymer rubber, and any conventional hydrogenation process may be employed.

The catalysts which may be used for the purpose of hydrogenation include, for example, palladium/silica and palladium complexes (Japanese Patent Laid-Open No. 252405/'91). Moreover, rhodium and ruthenium compounds as described in Japanese Patent Laid-Open Nos. 125858/'87, 42937/'87, 45402/'89, 45403/'89, 45404/'89 and 45405/'89 may also be used.

Ethylene-α-olefin copolymer rubber

The ethylene-α-olefin copolymer rubber used in the present invention is a copolymer of ethylene and α-olefin or of these monomers and an unconjugated diene, and this is a substantially saturated copolymer rubber. Typical examples thereof are low-crystalline or non-crystalline elastomers consisting essentially of ethylene and an α-olefin of 3 to 14 carbon atoms and having a degree of crystallinity of not greater than 20% and preferably not greater than 10%, such as ethylene-propylene copolymer rubber, ethylene-propylene-butene terpolymer rubber, ethylene-1-butene copolymer rubber, ethylene-propylene-unconjugated diene terpolymer rubber, ethylene-propylene-1-butene-unconjugated diene copolymer rubber, ethylene-1-butene-unconjugated diene multi-component copolymer rubber and mixtures thereof. Among them, ethylene-propylene-unconjugated diene terpolymer rubber is preferred.

Usable unconjugated dienes include dicyclopentadiene, 1,4-hexadiene, cyclooctadiene, methylene-norbornene, 5-ethylene-2-norbornene and the like. Among them, dicyclopentadiene and 5-ethylene-2-norbornene are preferred.

The ethylene-α-olefin copolymer rubber usually has a Mooney viscosity [$ML_{1+4}$ (100° C.)] of 10 to 180 and preferably 40 to 140, and preferably has an iodine value of not greater than 20.

In the above-described ethylene-α-olefin copolymer rubbers, the molar ratio of ethylene units to α-olefin units is usually in the range of 50/50 to 90/10 and preferably 60/40 to 84/16. In the case of ethylene-α-olefin-unconjugated diene copolymer rubbers (i.e., ternary or multi-component copolymers), the molar ratio of (ethylene+α-olefin) units to unconjugated diene units is usually in the range of 98/2 to 90/10 and preferably 97/3 to 94/6.

Mixture of nitrile-containing highly saturated copolymer rubber and ethylene-α-olefin copolymer rubber In the mixture of the nitrile-containing highly saturated copolymer rubber and the ethylene-α-olefin copolymer rubber which is used in the present invention, the mixing ratio of the rubber components is such that the nitrile-containing highly saturated copolymer rubber is usually present in an amount of 90 to 50% by weight and preferably 80 to 60% by weight and the ethylene-α-olefin copolymer rubber is usually present in an amount of 10 to 50% by weight and preferably 20 to 40% by weight. If the relative amount of the nitrile-containing highly saturated copolymer rubber is unduly large, the resulting seals will show a considerable change in volume upon exposure to hot water. On the other hand, if the relative amount of the ethylene-α-olefin copolymer rubber is unduly large, the resulting seals will be liable to the release of carbon black.

Organic peroxide vulcanizing agent

The vulcanizable rubber compositions of the present invention needs to be vulcanized with the aid of an organic peroxide vulcanizing agent. The use of a vulcanizing agent other than organic peroxide vulcanizing agents (in particular, a sulfur type vulcanizing agent) is undesirable in that the resulting seals will show a considerable change in volume upon exposure to hot water. No particular limitation is placed on the type of the organic peroxide vulcanizing agent used, and any of various organic peroxide vulcanizing agents commonly used for the peroxide vulcanization of rubber may be employed. Examples thereof include dicumyl peroxide, di-t-butyl peroxide, t-butylcumyl peroxide, benzoyl peroxide, 2,5-dimethyl-2,5-di(t-butylperoxy)hexyne-3, 2,5-dimethyl-2,5-di(benzoylperoxy)hexyne and α,α'-bis(t-butylperoxy-m-isopropyl)benzene. Among them, di-t-butyl peroxide is preferred. The organic peroxide vulcanizing agent is used in an amount of 0.1 to 30 parts by weight, preferably 0.5 to 20 parts by weight, and more preferably 1 to 10 parts by weight, per 100 parts by weight of the rubber mixture composed of the nitrile-containing highly saturated copolymer rubber and the ethylene-α-olefin copolymer rubber.

Moreover, similarly to ordinary organic peroxide vulcanization, an unsaturated compound may also be used as a crosslinking aid in the present invention.

Examples thereof include ethylene glycol dimethacrylate, trimethylolpropane trimethacrylate, N,N'-m-phenylenedimaleimide and triallyl isocyanurate. Among others, triallyl isocyanurate is preferred from the viewpoint of vulcanizate properties. The amount of crosslinking aid added is in the range of 0.1 to 15 parts by weight per 100 parts by weight of the mixture composed of the nitrile-containing highly saturated copolymer rubber and the ethylene-α-olefin copolymer rubber.

Carbon black

The vulcanizable rubber compositions of the present invention may contain carbon black in order to reinforce hot-water seals formed therefrom. Either high-structure or low-structure carbon black may be used, provided that it is selected from among various forms of carbon black which are commonly used as reinforcing agents for rubber. Generally, individual particles of carbon black three-dimensionally gather in chains or clusters to form aggregates. Then, the term "structure" as used herein means the shape into which the particles gather together, the number of particles constituting each aggregate, the magnitude of the interstitial volume, and the like.

The term "high-structure" refers to carbon black having an n-dibutyl phthalate (DBP) oil absorption of not less than 118 ml per 100 g as measured according to the method for testing carbon black for use with rubber (JIS K6221-1982 or ASTM D2414-90).

The term "low-structure" refers to carbon black having an n-dibutyl phthalate (DBP) oil absorption of not greater than 90 ml per 100 g as measured according to the method for testing carbon black for use with rubber (JIS K6221-1982 or ASTM D2414-90).

Specific examples of high-structure carbon black include HPC and CO for channel black; ISAF-HS, HAF-HS, MAF, FEF, APF, CRF, CF, SCF and EOF for furnace black; and HML for thermal black.

Specific examples of low-structure carbon black include EPO and MPC for channel black; ISAF-LS, HAF-LS, MAF-LS, FEF-LS, FF, HMF, GPF and SRF for furnace black; and MT and FT for thermal black.

These carbon blacks may be used alone or in admixture of two or more. Among others, low-structure carbon blacks such as FEF-LS, SRF, MAF-LS and MT are preferred. In hot-water seals formed by using them, the release of carbon black is markedly reduced and its performance is maintained even after long-term use.

Carbon black is used in an amount of 10 to 100 5 parts by weight and preferably 20 to 80 parts by weight, per 100 parts by weight of the mixture composed of the nitrile-containing highly saturated copolymer rubber and the ethylene-α-olefin copolymer rubber. If the amount of carbon black used is unduly small, the resulting vulcanized product will show a reduction in hardness and sealing properties. On the other hand, if it is unduly large, a large amount of a plasticizer must be added in order to regulate the hardness of the resulting hot-water seals. Consequently, the plasticizer may bleed to the surface and, moreover, the hot-water seals will show a reduction in strength.

If desired, the vulcanizable rubber compositions of the present invention may further contain other suitable compounding ingredients commonly used in the field of the rubber industry, such as reinforcing agents (e.g., silica and talc), fillers (e.g., calcium carbonate and clay), processing aids, process oils, antioxidants and antiozonants.

Moreover, if desired, the vulcanizable rubber compositions of the present invention may further contain another rubber such as acrylic rubber, halogenated butyl rubber, fluororubber, acrylonitrile-butadiene rubber, styrene-butadiene copolymer rubber, natural rubber or polyisoprene rubber, or ethylene-vinyl acetate copolymer resin. This other rubber or resin is usually used in an amount of 5 to 20% by weight and preferably 5 to 15% by weight, based on the combined weight of the nitrile-containing highly saturated copolymer rubber, the ethylene-α-olefin copolymer rubber and the other rubber or resin. Among others, the addition of acrylic rubber, halogenated butyl rubber or ethylene-vinyl acetate copolymer resin is preferable in that the co-vulcanizability of the vulcanizable rubber composition is improved thereby.

No particular limitation is placed on the method for preparing the vulcanizable rubber compositions of the present invention. However, they are usually prepared by mixing and kneading the nitrile-containing highly saturated copolymer rubber, the ethylene-α-olefin copolymer rubber, the vulcanizing agent and other compounding ingredients by means of a mixing machine such as a roll mill or a Banbury mixer.

A mixture composed of the nitrile-containing highly saturated copolymer rubber and the ethylene-α-olefin copolymer rubber is usually prepared by a dry blending process in which the nitrile-containing highly saturated copolymer rubber and the ethylene-α-olefin copolymer rubber are mixed at high temperature by means of a roll mill or a Banbury mixer, or a latex coprecipitation process in which a latex of the nitrile-containing highly saturated copolymer rubber is mixed with a latex of the ethylene-α-olefin copolymer rubber, the resulting mixture is coagulated and dried, and the resulting coagulum is heat-treated by means of an extruder or a Banbury mixer.

The vulcanized products obtained from the vulcanizable rubber compositions of the present invention exhibit excellent performance when used as hot-water seals for apparatus in which hot water containing bleaching powder capable of generating hypochlorous acid is hermetically sealed for a long period of time, such as hot-water generators. Specific examples of such hot-water seals include static seals (gaskets) such as O-rings and rectangular rings; and dynamic seals (packings) such as rotary seals, sliding seals and reciprocating seals.

BEST MODE FOR CARRYING OUT THE INVENTION

The present invention is more specifically described with reference to the following examples. In the examples and comparative examples, all parts and percentages are by weight unless otherwise stated.

In each example, various tests were carried out according to the procedures described below in detail.

(1) Vulcanizate properties

According to Japanese Industrial Standard (JIS) K6301, each of the unvulcanized rubber compositions prepared according to the formulations shown in Table 1 was vulcanized at 170° C. for 20 minutes to obtain a 2 mm thick sheet. Then, using a No. 3 dumbell die, specimens were punched therefrom and used to measure the tensile strength ($kgf/cm^2$) and elongation (%) of the vulcanized product. Moreover, its hardness was measured with a JIS spring-operated A type hardness tester.

(2) Heat aging

According to JIS K6301, the same vulcanized product as described above was maintained in air at 150° C. for 168 hours. Thereafter, its percent change in tensile strength (%), percent change in elongation (%) and change in hardness (points) were measured.

(3) Compression set

According to JIS K6301, the vulcanized product was maintained at 150° C. for 77 hours. Thereafter, its compression set (%) was measured.

(4) Immersion

An aqueous solution of sodium hypochlorite having a concentration of 200 ppm was prepared by diluting a commercially available aqueous solution (5%) of sodium hypochlorite 25-fold with distilled water. The same vulcanized product as used in the above-described test for the evaluation of vulcanizate properties was immersed in this aqueous solution at 80° C. After 168 hours, 336 hours, 500 hours and 1,000 hours, its percent change in volume (%), percent change in tensile strength (%), percent change in elongation (%) and change in hardness (points) were measured.

(5) Release of carbon black from the hot-water seal surface

The surface of the vulcanized product which had been immersed in an aqueous solution of sodium hypochlorite at 80° C. for 1,000 hours according to the above-described test (4) was visually observed and evaluated on the following three-grade rating system.

3: No carbon black was released.

2: A slight amount of carbon black was released.

1: A large amount of carbon black was released.

(6) Production of cracks in the hot-water seal surface

The surface of the vulcanized product which had been immersed in an aqueous solution of sodium hypochlorite at 80° C. for 1,000 hours according to the above-described test (4) was visually observed and evaluated on the following three-grade rating system.

3: No crack was produced.

2: A small number of cracks were produced.

1: A large number of cracks were produced.

EXAMPLES 1–7 AND COMPARATIVE EXAMPLES 1–3

According to the formulation shown in Table 1, a nitrile-containing highly saturated copolymer rubber (Zetpol 1010, 2010L or 2000L), an ethylene-α-olefin copolymer rubber (EPDM) and optionally ethylene-vinyl acetate copolymer resin (ELVAX) were mixed. Subsequently, carbon black, a crosslinking aid (TAIC), an organic peroxide vulcanizing agent (Vulcap 40KE) and an antioxidant (Nowguard 445) were incorporated therein. Thus, vulcanizable rubber compositions in accordance with the present invention were prepared. Then, the vulcanized products of these compositions were subjected to evaluation tests, and the results thus obtained are shown in Table 2 and Table 2 (contd.).

As comparative examples, vulcanizable rubber compositions containing acrylonitrile-butadiene copolymer rubber (Nipol 1042) or EPDM as shown in Table 1 were prepared and also subjected to the same evaluation tests as described above. The results thus obtained are shown in Table 2 and Table 2 (contd.).

TABLE 1

| Formulation | Example No. | | | | | | | | | |
|---|---|---|---|---|---|---|---|---|---|---|
| | Example | | | | | | | Comparative Example | | |
| | 1 | 2 | 3 | 4 | 5 | 6 | 7 | 1 | 2 | 3 |
| Zetpol 1010 *1 | | | | 70 | | | | | | |
| Zetpol 2010L *1 | 80 | 70 | 80 | | 70 | 70 | | | | 70 |
| Zetpol 2000L *1 | | | | | | | 70 | | | |
| EPDM *2 | 20 | 30 | 30 | 30 | 30 | 30 | 30 | 100 | | 30 |
| Nipol 1042 *3 | | | | | | | | | 100 | |
| ELVAX 40 *4 | | | 10 | | | | | | | |
| FEF-LS carbon black | 40 | 40 | 40 | 40 | | | 40 | 40 | 40 | 40 |
| FEF-HS carbon black | | | | | 40 | | | | | |
| MT carbon black | | | | | | 80 | | | | |
| TAIC *5 | 3 | 3 | 3 | 3 | 3 | 3 | 3 | 3 | 3 | |
| Vulcap 40KE *6 | 8 | 8 | 8 | 8 | 8 | 8 | 8 | 8 | 8 | |
| Nowguard 445 *7 | 1 | 1 | 1 | 1 | 1 | 1 | 1 | 1 | 1 | |
| Stearic acid | | | | | | | | | | 1 |
| Zinc oxide | | | | | | | | | | 5 |
| Tetramethylthiuram disulfide | | | | | | | | | | 1.5 |
| 2-Mercaptobenzothiazole | | | | | | | | | | 0.5 |
| Sulfur | | | | | | | | | | 0.5 |

Notes:
*1 Nitrile-containing highly saturated copolymer rubbers manufactured by Nippon Zeon Co., Ltd.

| | Iodine value | Mooney viscosity | Bound acrylo-nitrile content (% by weight) |
|---|---|---|---|
| Zetpol 1010 | 10 | 85 | 44 |
| Zetpol 2010L | 4 | 58 | 36 |
| Zetpol 2000L | 4 | 65 | 36 |

*2 An ethylene (55 mole %)-propylene (40 mole %)-dicyclopentadiene (5 mole %) copolymer [Mooney viscosity = 80].
*3 An acrylonitrile-butadiene copolymer rubber manufactured by Nippon Zeon Co., Ltd. [bound acrylonitrile content = 33.5% by weight].
*4 Ethylene-vinyl acetate copolymer resin manufactured by E. I. du Pont de Nemours & Co. [vinyl acetate content = 40% by weight].
*5 A crosslinking aid [triallyl isocyanurate].
*6 An organic peroxide vulcanizing agent [1,3-bis(t-butyl-peroxyisopropyl)benzene].
*7 An antioxidant [substituted diphenylamine].

TABLE 2

| | Example No. | | | | | | | | | |
|---|---|---|---|---|---|---|---|---|---|---|
| | Example | | | | | | | Comparative Example | | |
| Measurement | 1 | 2 | 3 | 4 | 5 | 6 | 7 | 1 | 2 | 3 |
| Vulcanizate properties | | | | | | | | | | |
| Hardness (JIS A) | 71 | 71 | 72 | 74 | 74 | 73 | 73 | 72 | 61 | 70 |
| Tensile strength (kgf/cm$^2$) | 233 | 218 | 205 | 228 | 254 | 203 | 226 | 130 | 186 | 172 |
| Elongation (%) | 300 | 280 | 250 | 300 | 250 | 230 | 280 | 120 | 380 | 480 |
| Heat aging test | | | | | | | | | | |
| Change in hardness (points) | 6 | 5 | 5 | 5 | 4 | 5 | 3 | 1 | 24 | 13 |
| Percent change in tensile strength (%) | −15 | −15 | −13 | −14 | −18 | −16 | −8 | −25 | −48 | −38 |
| Percent change in elongation (%) | −26 | −23 | −20 | −21 | −19 | −18 | −9 | −8 | −76 | −59 |
| Compression set | 24.3 | 23.6 | 22.4 | 22.8 | 24.0 | 21.3 | 26.2 | 18.3 | 38.2 | 88.9 |
| 168-hour immersion test | | | | | | | | | | |
| Percent change in volume (%) | 5.5 | 4.2 | 3.3 | 3.1 | 4.8 | 2.5 | 6.0 | 1.0 | 8.5 | 8.4 |
| Change in hardness (points) | −4 | −3 | −2 | −2 | −4 | −2 | −4 | 0 | −2 | −4 |
| Percent change in tensile strength (%) | −8 | −10 | −14 | −9 | −12 | −8 | −5 | −49 | −23 | −10 |
| Percent change in elongation (%) | −5 | −6 | −8 | −5 | −7 | −5 | −3 | −8 | −18 | −12 |
| 336-hour immersion test | | | | | | | | | | |
| Percent change in volume (%) | 5.9 | 4.6 | 3.5 | 3.2 | 5.0 | 3.2 | 6.4 | 1.0 | 12.4 | 10.2 |
| Change in hardness (points) | −4 | −3 | −2 | −3 | −6 | −3 | −4 | 2 | 4 | −1 |
| Percent change in tensile strength (%) | −10 | −12 | −20 | −9 | −15 | −8 | −8 | −63 | −28 | −18 |
| Percent change in elongation (%) | −5 | −7 | −16 | −7 | −8 | −6 | −5 | −42 | −26 | −26 |
| 500-hour immersion test | | | | | | | | | | |
| Percent change in volume (%) | 7.1 | 5.9 | 5.2 | 4.2 | 6.8 | 4.0 | 6.8 | 1.8 | 13.6 | 10.5 |
| Change in hardness (points) | −5 | −3 | 0 | −1 | −5 | −3 | −4 | 3 | 8 | 3 |
| Percent change in tensile strength (%) | −10 | −13 | −16 | −10 | −18 | −12 | −9 | −61 | −31 | −36 |
| Percent change in elongation (%) | −6 | −6 | −8 | −8 | −15 | −9 | −8 | −33 | −38 | −48 |
| 1,000-hour immersion test | | | | | | | | | | |
| Percent change in volume (%) | 6.5 | 5.4 | 4.3 | 3.9 | 6.5 | 3.8 | 6.1 | 0.4 | 15.2 | 10.0 |
| Change in hardness (points) | −4 | −3 | 0 | 0 | −5 | −1 | −2 | 4 | 15 | 6 |
| Percent change in tensile strength (%) | −12 | −15 | −24 | −12 | −22 | −14 | −10 | −65 | −38 | −51 |
| Percent change in elongation (%) | −6 | −8 | −12 | −9 | −19 | −12 | −8 | −42 | −49 | −82 |
| Separation of carbon black | 3 | 3 | 3 | 3 | 2 | 3 | 3 | 1 | 3 | 2 |
| Surface cracking | 3 | 3 | 3 | 3 | 3 | 3 | 3 | 2 | 1 | 3 |

It can be seen from the results shown in Table 2 and Table 2 (contd.) that the vulcanized products obtained by vulcanizing the rubber compositions of the present invention show a low percent change in volume and elongation when subjected to long-term immersion tests, thus exhibiting excellent performance upon exposure to hot water generating hypochlorous acid. It can also be seen that the release of carbon black and the production of surface cracks are markedly decreased as compared with conventionally used EPDM and NBR.

Moreover, it can be seen that, especially when low-structure carbon black (FEF-LS) was used (Examples 1, 2, 3, 4, 6 and 7), the separability of carbon black is further improved as compared with the example in which high-structure carbon black (FEF-HS) was used (Example 5).

Furthermore, it can be seen that, as compared with the example in which a sulfur type vulcanizing agent was used (Comparative Example 3), the aforesaid vulcanized products show a much lower percent change in volume when subjected to immersion tests and a much lower percent change in hardness when subjected to a heat aging test.

Industrial Applicability

As illustrated by the above-described examples and comparative examples, the hot-water seals obtained by vulcanizing the rubber compositions of the present invention show a much lower percent change in volume and elongation, and are less liable to the release of carbon black and the production of surface cracks, as compared with conventional hot-water seals formed from NBR and the like. Accordingly, the vulcanizable rubber compositions of the present invention can be used as materials for hot-water seals to industrial advantage.

We claim:

1. A vulcanizable rubber composition for use as hot-water seals comprising 100 parts by weight of a rubber mixture composed of 90 to 50% by weight of a nitrile-containing highly saturated copolymer rubber having an iodine value of not greater than 80 obtained by hydrogenating the conjugated diene portions of an unsaturated nitrile-conjugated diene copolymer rubber of unsaturated nitrile-conjugated diene-ethylenically unsaturated monomer terpolymer rubber, and 10 to 50% by weight of an ethylene-α-olefin copolymer rubber, wherein the sum of these components is 100% by weight; and 0.1 to 30 parts by weight of an organic peroxide vulcanizing agent.

2. A vulcanizable rubber composition for use as hot-water seals as claimed in claim 1 wherein the unsaturated nitrile in the unsaturated nitrile-conjugated diene copolymer rubber or unsaturated nitrile-conjugated diene-ethylenically unsaturated monomer terpolymer rubber is selected from the group consisting of acrylonitrile, methacrylonitrile and α-chloroacrylonitrile.

3. A vulcanizable rubber composition for use as hot-water seals as claimed in claim 1 wherein the conjugated diene in the unsaturated nitrile-conjugated diene copolymer rubber or unsaturated nitrile-conjugated diene-ethylenically unsaturated monomer terpolymer rubber is selected from the group consisting of 1,3-butadiene, 2,3-dimethylbutadiene, isoprene and 1,3-pentadiene.

4. A vulcanizable rubber composition for use as hot-water seals as claimed in claim 1 wherein the unsaturated nitrile-conjugated diene copolymer rubber or unsaturated nitrile-conjugated diene-ethylenically unsaturated monomer terpolymer rubber is an unsaturated nitrile-conjugated diene-unsaturated dicarboxylic acid ester terpolymer rubber.

5. A vulcanizable rubber composition for use as hot-water seals as claimed in claim 1 wherein the unsaturated nitrile-conjugated diene-ethylenically unsaturated monomer terpolymer rubber has 10 to 50% by weight of unsaturated nitrile units and 1 to 80% by weight of unsaturated dicarboxylic acid ester units.

6. A vulcanizable rubber composition for use as hot-water seals as claimed in claim 1 wherein the ethylene-α-olefin copolymer rubber is an ethylene-propylene-unconjugated diene terpolymer rubber.

7. A vulcanizable rubber composition for use as hot-water seals as claimed in claim 1 wherein the unconjugated diene in the ethylene-propylene-unconjugated diene terpolymer rubber is dicyclopentadiene.

8. A vulcanizable rubber composition for use as hot-water seals as claimed in claim 1 which contains carbon black.

9. A vulcanizable rubber composition for use as hot-water seals as claimed in claim 8 wherein the carbon black is low-structure carbon black.

10. A vulcanizable rubber composition for use as hot-water seals as claimed in claim 9 wherein the low-structure carbon black is selected from the group consisting of FEF-LS, MAF-LS, SRF and MT.

11. A method of sealing hot-water generators which comprises providing said hot water generators with hot-water seals comprising a vulcanizable rubber composition comprising 100 parts by weight of a rubber mixture composed of 90 to 50% by weight of a nitrile-containing saturated copolymer rubber having an iodine value of not greater than 80 obtained by hydrogenating the conjugated diene portions of an unsaturated nitrile-conjugated diene copolymer rubber or unsaturated nitrile-conjugated diene-ethylenically unsaturated monomer terpolymer rubber, and 10 to 50% by weight of an ethylene-α-olefin copolymer rubber, wherein the sum of these components is 100% by weight; and 0.1 to 30 parts by weight of an organic peroxide vulcanizing agent.

12. The method of claim 11 of sealing hot water generators wherein the unsaturated nitrile in the unsaturated nitrile-conjugated diene copolymer rubber or unsaturated nitrile-conjugated diene-ethylenically unsaturated monomer terpolymer rubber is selected from the group consisting of acrylonitrile, methacrylonitrile and α-chloroacrylonitrile.

13. The method of claim 11 of sealing hot water generators wherein the conjugated diene in the unsaturated nitrile-conjugated diene copolymer rubber or unsaturated nitrile-conjugated diene-ethylenically unsaturated monomer terpolymer rubber is selected from the group consisting of 1,3-butadiene, 2,3-dimethylbutadiene, isoprene and 1,3-pentadiene.

14. The method of claim 11 of sealing hot water generators wherein the unsaturated nitrile-conjugated diene copolymer rubber or unsaturated nitrile-conjugated diene-ethylenically unsaturated monomer terpolymer rubber is an unsaturated nitrile-conjugated diene-unsaturated dicarboxylic acid ester terpolymer rubber.

15. The method of claim 11 of sealing hot water generators wherein the unsaturated nitrile-conjugated diene-ethylenically unsaturated monomer terpolymer rubber has 10 to 50% by weight of unsaturated nitrile units and 1 to 80% by weight of unsaturated dicarboxylic acid ester units.

16. The method of claim 11 of sealing hot water generators wherein the ethylene-α-olefin copolymer rubber is an ethylene-propylene-unconjugated diene terpolymer rubber.

17. The method of claim 11 of sealing hot water generators wherein the unconjugated diene in the ethylene-propylene-unconjugated diene terpolymer rubber is dicyclopentadiene.

18. The method of claim 11 of sealing hot water generators wherein the hot water generators contain hot water and bleaching powder capable of generating hypochlorous acid.

* * * * *